United States Patent [19]

Antal et al.

[11] Patent Number: 5,431,524

[45] Date of Patent: Jul. 11, 1995

[54] VEHICLE TRANSPORT TRAILER

[76] Inventors: Donald V. Antal; Billy K. Hull, both of 2335 S. Lakeside, Apt. 3, Saginaw, Mich. 48603

[21] Appl. No.: 249,950

[22] Filed: May 27, 1994

[51] Int. Cl.$^6$ .............................. B60P 7/08; B60P 3/06; E01D 15/04
[52] U.S. Cl. .................................. 414/537; 414/921; 296/61; 410/7; 410/23
[58] Field of Search ............ 410/3, 4, 7, 9–12, 410/19, 21–23, 96, 97, 100; 414/537, 921; 280/304.1; 296/61; 14/71.1

[56] References Cited

U.S. PATENT DOCUMENTS

| | | |
|---|---|---|
| 3,009,732 | 11/1961 | Brown . |
| 3,822,798 | 7/1974 | Neff . |
| 4,060,271 | 11/1977 | Williams ........................ 410/23 X |
| 4,155,468 | 5/1979 | Royce ........................ 414/537 X |
| 4,281,950 | 8/1981 | Lehman et al. . |
| 4,718,812 | 1/1988 | Smalley et al. ............... 296/61 X |
| 4,966,392 | 10/1990 | Featon et al. ................. 410/7 X |
| 4,995,775 | 2/1991 | Gresham ..................... 410/10 |
| 5,026,225 | 6/1991 | McIntyre ................... 280/304.1 |
| 5,052,879 | 10/1991 | Wolfe ......................... 414/921 X |
| 5,199,842 | 4/1993 | Watt et al. .................... 414/537 |
| 5,259,081 | 11/1993 | Henderson .................. 410/19 X |

FOREIGN PATENT DOCUMENTS 2814131 10/1979 Germany .................. 410/96
92/21532 12/1992 WIPO ..................... 414/921

*Primary Examiner*—Michael S. Huppert
*Assistant Examiner*—Stephen Gordon
*Attorney, Agent, or Firm*—Learman & McCulloch

[57] ABSTRACT

The vehicle transport trailer (10) has a frame (12) supported by wheels (16). A horizontal platform (18) is supported by the frame (12) and enclosed by front and side walls (22, 24, and 26) and a top (28). The top (28) includes an openable rear portion (34) attached to the front portion (32) by a hinge (36). A ramp (38) is attached to the frame (12) and is pivoted between a vertical position in which it closes an opening (30) and an inclined position with a free edge (42) on the ground. A front securing assembly (56) prevents rearward movement of a transported vehicle (196). A rear securing assembly (140) prevents forward movement of a transported vehicle (196). The front securing assembly (56) includes left and right side hook assemblies (58 and 60) which automatically engage a transported vehicle. The rear securing assembly (140) includes left and right side rear hook and cable assemblies (142 and 144) with cables (148 and 182) attached to cable tensioning arms (150 and 184). The cable tensioning arms (150 and 184) tension the cables (148 and 182) when the ramp (38) is pivoted from the inclined position to a vertical position. Adjustments are provided to accommodate various wheelchairs and carts.

16 Claims, 2 Drawing Sheets

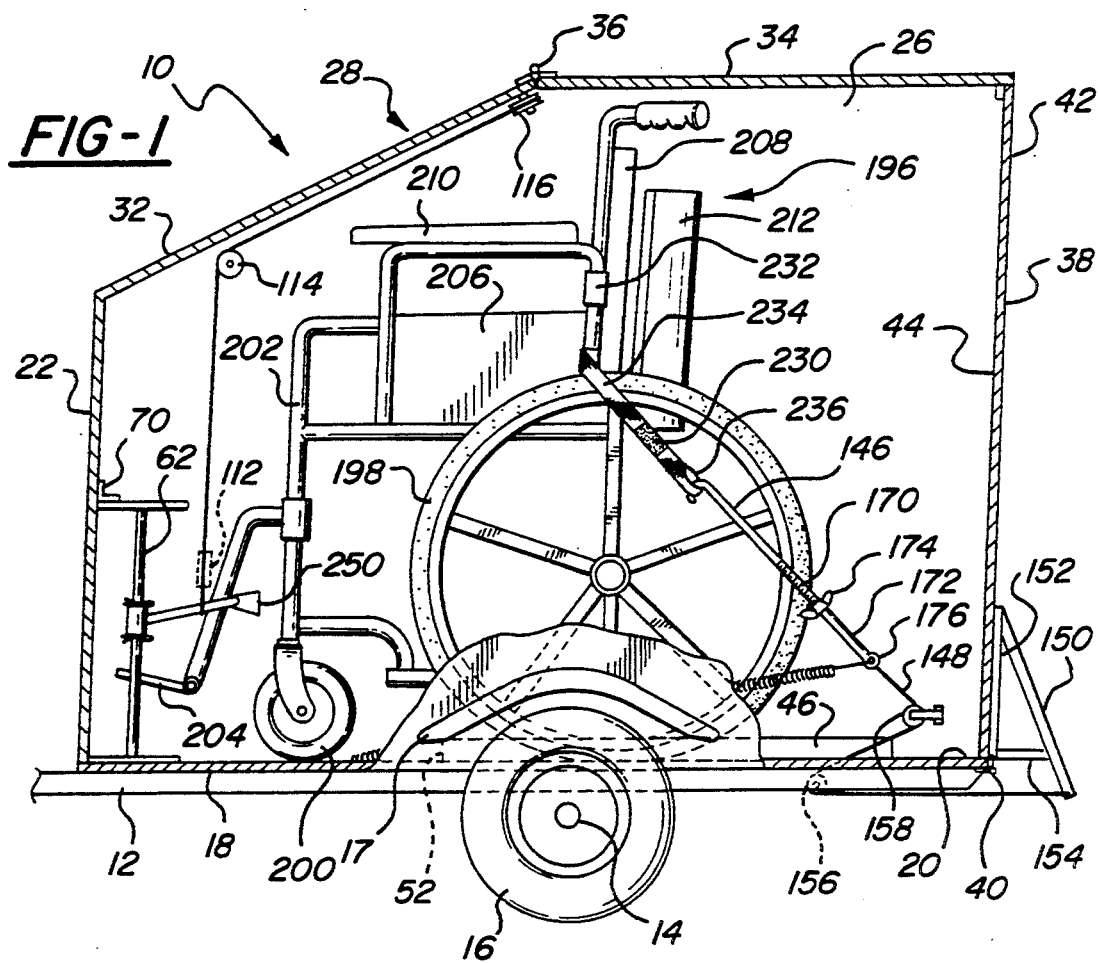
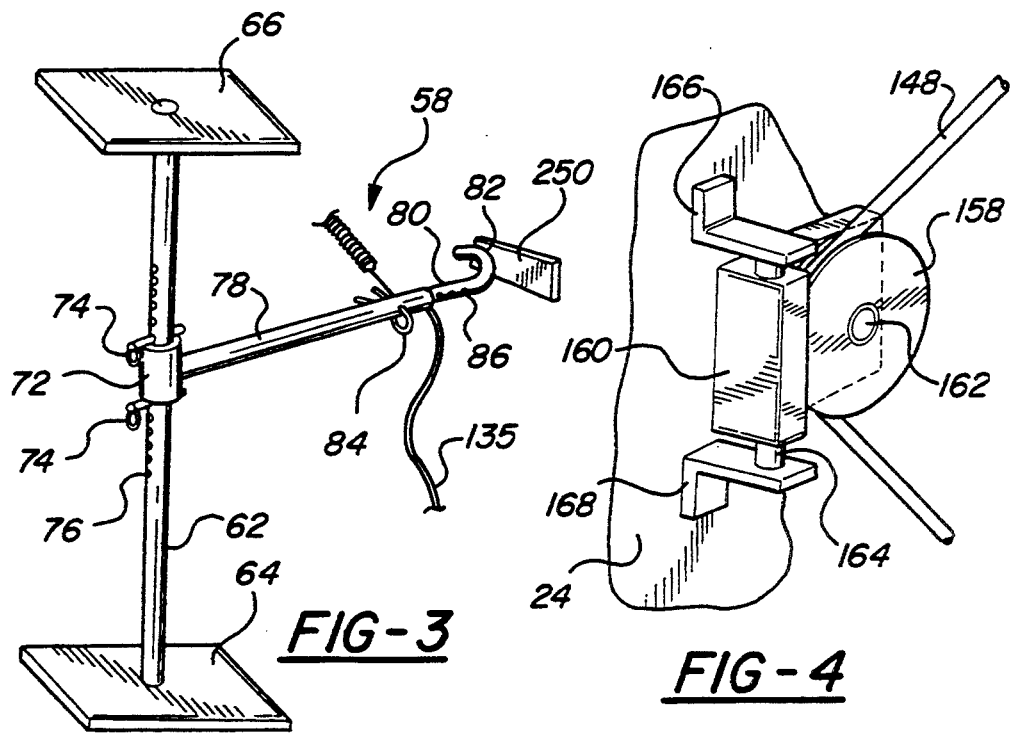

VEHICLE TRANSPORT TRAILER

TECHNICAL FIELD

This invention is in a trailer for transporting a motorized vehicle, and more particularly in a trailer for transporting a vehicle for physically challenged individuals and others who desire to use such a vehicle.

BACKGROUND OF THE INVENTION

Motorized wheelchairs and motorized carts are employed for transportation inside homes, inside buildings, and in outside areas where road-type vehicles cannot be used due to their size and weight. Van-type vehicles are frequently converted for transporting motorized wheelchairs and motorized carts that are similar in size to wheelchairs. These van conversions include an elevator that raises a wheelchair from the ground and lowers a wheelchair to the ground and that folds up into the inside of the van when not being used. By employing a van that has been converted to load, transport, and unload a motorized wheelchair, a physically challenged individual can leave his home, board the converted van, travel in the van on highways at highway speeds to a place of work, for example, disembark from the converted van with his motorized wheelchair, and proceed to participate in a planned activity. In some cases, with special equipment inside the van, a physically challenged individual can drive the conversion van himself.

Vans converted to transport motorized wheelchairs, carts and other similar vehicles can give many physically challenged individuals freedom that they would not otherwise have. Unfortunately, converted vans are not available to many people who must use motorized wheelchairs or similar small vehicles for mobility. The conversions are expensive. The vans which are converted are also expensive. Such vans are usually relatively large vehicles that are expensive to operate due to their size and weight.

Trailers are available to transport most articles known to man which can be accommodated by our highway system. Motor vehicles are commonly transported on trailers. A trailer for transporting motorized wheelchairs or similar motorized vehicles in an assembled ready-to-use condition has special requirements. There must be a ramp or other system for loading the motorized wheelchair on the trailer. The motorized wheelchair must be secured on the trailer to prevent damage during transport. The trailer must also be enclosed to protect the transported vehicle from the elements. The enclosure on the trailer and the securing apparatus should accommodate a variety of motorized vehicles. The trailer must also be lightweight and easy to pull with most family-type automotive vehicles.

SUMMARY OF THE INVENTION

An object of the invention is to provide an enclosed vehicle transport trailer that a motorized wheelchair can move in to under its own power.

Another object of the invention is to provide a securing system for securing a motorized wheelchair in a trailer, which is easy to engage and disengage from the transported wheelchair.

A further object of the invention is to provide a securing system for securing a motorized wheelchair which can be easily adjusted to accommodate motorized wheelchairs with a variety of constructions, sizes, and shapes.

The vehicle transport trailer has a frame supported by an axle and at least two wheels and adapted to be attached to a tow vehicle. A horizontal platform is mounted on the frame. Side walls, a front wall, and a top are attached to each other and to the frame and horizontal platform. A ramp is pivotally attached to the frame and the horizontal platform. The ramp can be pivoted to a generally vertical position in which it closes a vehicle entry and exit opening. The ramp can also pivot to a position in which one end of the ramp rests on the ground and the ramp provides an inclined surface extending from the ground to an edge of the horizontal platform.

A front securing assembly, attached to the frame, is provided for securing the front of a transported vehicle and preventing a vehicle being transported by the trailer from moving rearward. A rear securing assembly, attached to the frame, is provided for securing the rear of the vehicle being transported and preventing the vehicle from moving forward relative to the frame. The front securing assembly includes a pair of hooks that pivot about vertical axes. The hooks are vertically adjusted to various heights and are adjustable in length to accommodate a variety of vehicles. A cable system is provided for disengaging the hooks from a vehicle.

The rear securing assembly includes a pair of hooks and cable assemblies. The hooks are connected to the rear portion of a vehicle that is to be transported by the trailer. The hook portion of each hook and cable assembly is attached to a transport vehicle and the cable portion is attached to a cable tensioning arm secured to the ramp. Pivotal movement of the ramp to a generally vertical position takes up the cable and secures the vehicle to the trailer.

The foregoing and other objects, features, and advantages of the present invention will become apparent in the light of the following detailed description of exemplary embodiments thereof, as illustrated in the accompanying drawings.

BRIEF DESCRIPTION OF THE DRAWINGS

FIG. 1 is a side elevational view of the vehicle transport trailer with portions of one side wall broken away to expose the inside of the trailer and a wheelchair secured therein;

FIG. 3 is an enlarged perspective view of one of the hooks and vertical pivots of the front securing assembly; and FIG. 4 is an enlarged perspective view of one of the upper guide pulleys for the rear hook and cable assemblies.

DESCRIPTION OF THE PREFERRED EMBODIMENT

Figure 2:
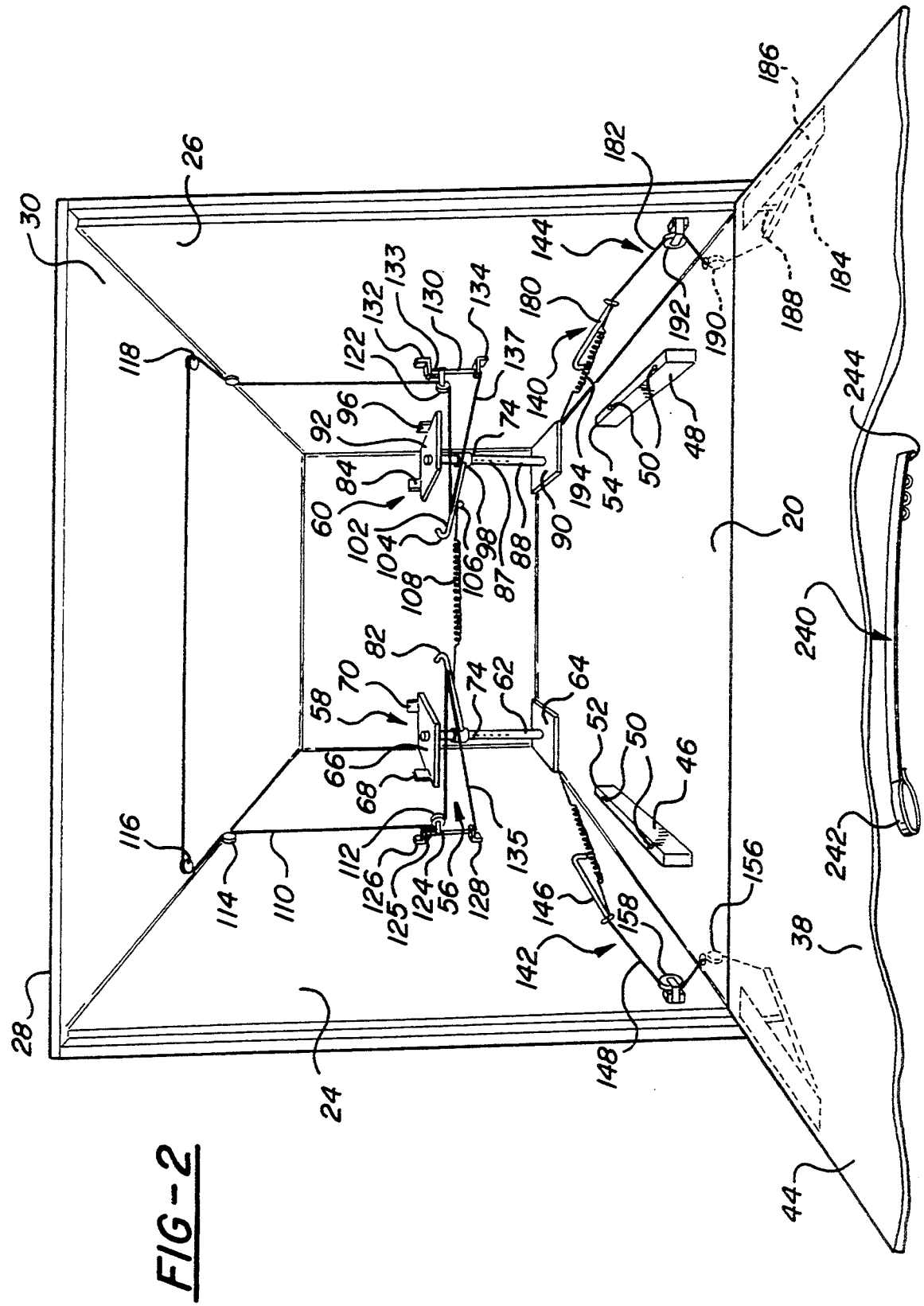
FIG. 2 is a rear perspective view with the ramp open and the inside of the trailer exposed.

The vehicle transport trailer 10 has a generally horizontal frame 12. The forward portion of the horizontal frame includes an appropriate connector (not shown) for connecting the trailer to a tow vehicle. Common connectors include a ball socket for a ball hitch or a ring that forms an eye that engages the pin of a pintle hook. An axle assembly 14 and at least two wheels 16 support the generally horizontal frame. A fender 17 is attached to each side wall 24 or 26 directly above each wheel 16 to deflect water and gravel thrown up from a road surface. A suspension system (not shown) is normally employed to connect the axle assembly 14 to the frame 12. A number of different suspensions could be used. These suspension systems include leaf springs, coil springs, torsion bars, air bags, walking beams, and others. The vehicle transport trailer 10 and the vehicle it transports are generally lightweight and can be supported by a simple lightweight suspension system. However, many of the vehicles to be transported by the trailer have sophisticated electronic controls that can be damaged by vibrations and jarring from bumps and potholes. A good suspension system is required to protect the vehicle being transported and to travel at highway speeds.

A horizontal platform 18 is secured to the horizontal frame 12. The horizontal platform has a support surface 20 for supporting a vehicle that is transported by the vehicle transport trailer 10. A front wall 22 is attached to the frame 12 and the front edge of the horizontal platform 18. Side walls 24 and 26 are attached to the side edges of the horizontal platform 18 and to opposite sides of the front wall 22. A top 28 is attached to the upper edges of the front wall 22 and the side walls 24 and 26. The horizontal platform 18, the side walls 24 and 26 and the top 28 define an opening 30 at the end of the horizontal platform 18 opposite the front wall 22.

The top 28 of the vehicle transport trailer 10, as shown in FIG. 1, includes a front portion 32 and a rear portion 34. The front portion 32 is rigidly secured to the front wall 22 and the side walls 24 and 26 and is inclined upwardly and rearwardly from the upper edge of the front wall. The inclined front portion 32 of the top 28 reduces wind resistance. The rear portion 34 of the top wall 28 is connected to the front portion 32 by a hinge 36. The hinge 36 allows the rear portion 34 of the top 28 to be pivoted about the axis of the hinge 36 to a position in which it is supported on the upper surface of the front portion 32 of the top. In this position the vehicle transport trailer is open above the side walls 24 and 26 and to the rear of the hinge 36.

A ramp 38 is pivotally attached to the horizontal frame 12 and the rear edge of the horizontal platform 18 by hinges 40. In the position shown in FIG. 1 the ramp 38 is generally vertical and closes the opening 30. The ramp 38 pivots about the axis of the hinges 40 to open the opening 30 until the free edge 42 contacts the ground. With the free edge 42 of the ramp 38 on the ground, the ramp surface 44 is a gentle incline from the ground to the horizontal platform 18. A motorized vehicle, which is transported by the vehicle transport trailer 10, can move up the ramp surface 44 with a driver under its own power.

A left side vehicle wheel guide 46 is attached to the support surface 20 of the horizontal platform 18 adjacent to the area where a rear vehicle wheel is to be supported while being transported. A right side vehicle wheel guide 48 is attached to the support surface 20 of the horizontal platform 18 adjacent to the area where a rear vehicle wheel is to be supported while being transported. The left and right side vehicle wheel guides 46 and 48 are attached to the horizontal platform 18 by fasteners 50. The fasteners 50 permit lateral adjustment of the left and right side vehicle wheel guides 46 and 48 to accommodate vehicles with different spacing between the wheels. If desired, rear extensions of the left and right side wheel guides 46 and 48 can be attached to the ramp surface 44 on the ramp 38. The left and right side vehicle wheel guides 46 and 48 are normally parallel to each other and spaced apart a distance slightly larger than the outside width of the main wheels of the vehicle being transported. With vehicles having front wheels that are spaced apart so that the rear wheels travel in the same track as the front wheels, the left and right side vehicle wheel guides 46 and 48 can both be attached to the support surface 20 of the horizontal platform 18 between the rear wheels of the vehicle. With this arrangement, the left and right side vehicle wheel guides 46 and 48 are parallel to each other and spaced apart a distance slightly less than the inside width between the main wheels of a vehicle being transported.

Front wheels on some vehicles that are transported by the vehicle transport trailer 10 are caster wheels. Caster wheels rotate 180° about a generally vertical axis when the direction of movement of the vehicle is reversed. The left and right side vehicle wheel guides 46 and 48 have forward ends 52 and 54 that are spaced some distance to the rear of the front wheels of a vehicle being transported when the vehicle is in its transport position. This positioning of the front wheels of a vehicle relative to the vehicle wheel guides 46 and 48, provides caster wheels spaced to reverse directions when the vehicle is backed from the vehicle transport trailer 10. Caster wheels could catch on the left or right side vehicle wheel guides 46 or 48 and prevent further rearward movement of a vehicle if the left and right side vehicle wheel guides extend forward between the caster wheels. If the vehicle being transported by the vehicle transport trailer 10 has steered front wheels, the left and right side vehicle wheel guides 46 and 48 can extend forward past the forwardmost position of the front wheels.

A front securing assembly 56 includes a left side hook assembly 58 and a right side hook assembly 60. The left side hook assembly 58 includes a vertical pivot shaft 62 attached to a lower plate 64 secured to the horizontal platform 18 and an upper plate 66. The upper plate 66 is parallel to the lower plate 64 and is attached to the side wall 24 and the front wall 22 by brackets 68 and 70, shown in FIG. 2, and by bolts. A sleeve 72 is pivotally attached to the vertical pivot shaft 62. The vertical position of the sleeve 72 on the pivot shaft 62 can be adjusted by removing the pins 74 from the hole 76 drilled through the pivot shaft, moving the sleeve to the desired vertical position and then reinserting the pins 74 to vertically fix the sleeve. A tube 78 is welded to the sleeve 72 and extends radially outward and axially upward from the sleeve. The shank 80 of a hook 82 is telescopically received in the free end of the tube 78. A spring clip pin 84 passes through a hole bored through the tube 78 and one of a series of passages 86 drilled through the shank 80. The pin 84 can be removed and then reinserted into a different passage 86 in the shank 80 to adjust the length of the left side hook assembly 58 between the hook 82 and the vertical pivot shaft 62.

The right side hook assembly 60 includes a vertical pivot shaft 88 attached to a lower plate 90 secured to the horizontal platform 18 and an upper plate 92. The upper plate 92 is parallel to the lower plate 90 and is attached to the side wall 26 and the front wall 22 by brackets 94 and 96, shown in FIG. 2, and by bolts. A sleeve 98 is pivotally attached to the vertical pivot shaft 88. The vertical position of the sleeve 98 is adjusted on the pivot shaft 88 in the same way the sleeve 72 is vertically adjusted on the pivot shaft 62 as explained above. A tube 100 is welded to the sleeve 98 and extends radially outward and axially upward from the sleeve. A shank 102 of a hook 104 is telescopically received in the free end of the tube 100. The length of the right side hook assembly 60 between the hook 104 and the vertical pivot shaft 88 is adjusted and held by a spring clip pin. 106 the same way the length between the hook 82 and the vertical pivot shaft 62 is adjusted and held by a spring clip pin 84.

A tension spring 108 is connected to the left side hook assembly 58 and the right side hook assembly 60 to bias both hook assemblies toward a vehicle that is to be transported. A cable 110 has one end attached to the left side hook assembly 58 at a point remote from the sleeve 72. The cable 110 is trained around a first pulley 112, a second pulley 114, a third pulley 116, a fourth pulley 118, a fifth pulley 120, and a sixth pulley 122. The other end of the cable is attached to the right side hook assembly 58 at a point remote from the sleeve 98. The first pulley 112 is pivotally and slideably connected to a vertical rod 124. The vertical rod 124 is connected to the inside of the side wall 24 by an upper bracket 126 and a lower bracket 128.

A tubular sleeve 125 on the vertical rod 124 vertically positions the first pulley 112. The length of the tubular sleeve 125 can be changed to change the vertical position of the first pulley 112. The first pulley 112 rotates about a horizontal axis. The second pulley 114 is above the first pulley 112 and rotates about a horizontal transverse axis. The third pulley 116 is to the rear of the second pulley 114, adjacent to the side wall 24, rotates about a generally vertical axis and is attached to the underside of the front portion 32 of the top 28. The fourth pulley 118 is transversely spaced to one side of the third pulley 116, adjacent to the side wall 24, attached to the underside of the front portion 32 of the top 28 and rotates about an axis parallel to the axis of the third pulley 116. The fifth pulley 120 is attached to the side wall 26 forward of the fourth pulley 118 and rotates about the same horizontal transverse axis that the second pulley 114 rotates about. The sixth pulley 122 rotates about a horizontal axis and is pivotally and slideably mounted on a vertical rod 130. The vertical rod 130 is connected to the inside of the side wall 26 by an upper bracket 132 and a lower bracket 134. A tubular sleeve 133 on the vertical rod 130 vertically positions the sixth pulley 122. The length of the tubular sleeve 133 can be changed to change the vertical distance between the sixth pulley and the upper bracket 132. The length of the cable 110 can determine the space between the hook 82 and the hook 104 when the vehicle transport trailer 10 is empty. A stop cable 135 can be attached to the hook 82 and the lower bracket 128 on the side wall 24 and a stop cable 137 can be attached to the hook 104 and the lower bracket 134 on the side wall 26. If the stop cables 135 and 137 are used, they should determine the space between the hooks 82 and 104. The horizontal run of the cable 110 between the third pulley 116 and the fourth pulley 118 can be pulled to separate the hooks 82 and 104.

A rear securing assembly 140 includes a left side rear hook and cable assembly 142 and a right side rear hook and cable assembly 144. The left side rear hook and cable assembly 142 includes a left side rear hook 146 adapted to be connected to a vehicle to be transported. A cable 148 is connected to the left side rear hook 146 and to the lower end of a cable tensioning arm 150 secured to the ramp 38. The cable tensioning arm 150 is welded to the upper portion of a flat plate 152 secured directly to the outside surface of the ramp 38. A bar 154 is welded to the flat plate 152 and to the cable tensioning arm 150 and extends generally perpendicular to the flat plate 152 as shown in FIG. 1. The bar 154 is attached to the flat plate 152 above the pivot axis of the hinge 40 as shown in FIG. 1 to ensure that the bar does not interfere with movement of the ramp 38 to the inclined position with its free edge 42 in contact with the ground. The lower end of the cable tensioning arm 150 extends down below the hinge 40. The cable 148 extends forward from the lower end of the cable tensioning arm 150, around a bottom pulley 156 rotatably about a horizontal axis, upwardly and to the rear from the bottom pulley, through a passage through the horizontal platform 18, around an upper rear pulley 158 and to the left side rear hook 146. The upper rear pulley 158 is attached to a pulley block 160 as shown in FIG. 4. The upper rear pulley 158 rotates about the axis of a horizontal pin 162 that is secured to the pulley block 160. The pulley block 160 is pivotally supported by a vertical shaft 164 for pivotal movement about the vertical axis of the vertical shaft. The vertical shaft 164 is attached to the left side wall 24 by an upper bracket 166 and a lower bracket 168.

The left side rear hook 146 includes a threaded portion 170 that screws into the base of a clevis 172 to adjust the length of the left side rear hook and cable assembly 142. A wing nut 174 is provided to hold the length adjustment once it is made. The cable 148 is attached to the clevis 172 by a pin 176. A tension spring 178 is attached to the pin 176 through the clevis 172 and to the left side wall 24 to pull the clevis 172 forward toward the front wall 22 and toward the left side wall 24. The tension spring 178 keeps some tension on the cable 148 without interfering with attaching the left side rear hook 146 to a vehicle that is to be transported.

The right side rear hook and cable assembly 144 is essentially identical to the left side rear hook and cable assembly 142. The right side rear hook and cable assembly 144 includes a right side rear hook 180, shown in FIG. 2, adapted to be connected to a vehicle to be transported. A cable 182 is connected to the right side rear hook 180 and to the lower end of the cable tensioning arm 184 secured to the ramp 38. The cable tensioning arm 184 is welded to the upper portion of a flat plate 186 secured directly to the outside surface of the ramp 38. A bar 188 is welded to the flat plate 186 and the cable tensioning arm 184. The lower end of the cable tensioning arm 184 extends down below the hinge 40. The cable 182 extends forward from the lower end of the cable tensioning arm 184, around a bottom pulley 190 rotatable about a horizontal axis, upward and to the rear from the bottom pulley, through a passage through the horizontal platform 18, around an upper rear pulley 192 and to the right side rear hook 180. The upper rear pulley 192 is attached to a pivoted pulley block like the pulley block 160 shown in FIG. 4. The right side rear hook 180 is identical to the left side rear hook 146 described above and shown in FIG. 1 and is attached to the cable 182. The right side rear hook 180 is adjustable to adjust the length of the right side rear hook and cable assembly 144. A tension spring 194 is attached to the right side rear hook 180 and to the right side wall 26 to pull the right side rear hook 180 forward toward the front wall 22 and toward the right side wall 26. The tension spring 194 also keeps some tension on the cable 182 without interfering with attaching the right side rear hook 180 to a vehicle that is to be transported.

A motorized wheelchair 196 is shown in the vehicle transport trailer 10 in FIG. 1. The motorized wheelchair 196 includes driven rear wheels 198, front caster wheels 200, and a frame 202. The frame 202 has an attached footrest 204, a seat 206, a backrest 208, armrests 210, and an electronic control module 212. The electronic control module 212 regulates the flow of current to the electric motors that drive the rear wheels 198. The motors and a power pack for supplying current for the motors are not shown in the drawing. Wheelchairs are available in a variety of sizes, shapes, and constructions. In addition to wheelchairs that are motor driven, there are a variety of motorized carts available for physically challenged individuals. Some of these carts have a single front wheel and two rear wheels. Other carts have two front wheels and one rear wheel. There are also carts with four wheels. The rear wheels can be driven or the front wheel can be driven. Steering can be manual, powered, or with caster wheels. The frames of motorized carts can be even more varied than the frames of vehicles that are commonly referred to as wheelchairs.

The vehicle transport trailer 10 described above will secure and transport many of the motorized wheelchairs and carts available today with minor adjustments that are provided. With these minor adjustments the vehicle transport trailer 10 can secure and transport most motorized wheelchairs and carts available today.

To load the motorized wheelchair 196 in the vehicle transport trailer 10, the opening 30 is opened by pivoting the ramp 38 about the axis of the hinges 40 from a vertical position until the free edge 42 of the ramp is on the ground. The right and left side vehicle wheel guides 46 and 48 are then adjusted to accommodate the spacing of the driven rear wheels 198. The height of the hook 82 of the left side hook assembly 58 is adjusted by removing the pins 74, sliding the sleeve 72 along the vertical pivot shaft 62 to the correct height and then inserting the pins 74 in holes 76 to hold the sleeve at the correct height. The height of the hook 104 of the right side hook assembly 60 is adjusted by removing pins 74, sliding the sleeve 98 along the vertical pivot shaft 88 to the correct height and then inserting the pins 74 in holes 87 in the vertical pivot shaft 88 to hold the sleeve at the correct height. The length between the hook 82 and the vertical pivot shaft 62 is adjusted by removing the spring clip pin 84 from a passage 86 in the shank 80, sliding the shank in the tube 78 to set the desired length and then inserting the spring clip pin 84 in another passage 86 to fix the length of the left side hook assembly 58. The length between the hook 104 and the vertical pivot shaft 88 is adjusted by removing the spring clip pin 106 from the passage 86 and the shank 102, sliding the shank in the tube 100 to set the desired length and then inserting the spring clip pin in another passage to fix the length of the right side hook assembly 60. The motorized wheelchair 196 is then moved forward until the hook 82 and the hook 104 contact the motorized wheelchair frame 202, are spread apart and are then pulled into locking engagement with the frame by the tension spring 108. The hooks 82 and 104 will then engage the frame 202 to limit movement of the wheelchair 196 to the rear.

The hooks 82 and 104 are contacted by the frame 202 of the motorized wheelchair 196 at points which result in the hooks being moved outwardly and spread apart in response to continued forward movement of the motorized wheelchair. For the frame 202 of the motorized wheelchair 196 to cam the hooks 82 and 104 outwardly away from each other, the motorized wheelchair must be centered between the hooks and the space between the two hooks must be accurately adjusted. The range of acceptable adjustments of the space between the two hooks 82 and 104 can be increased by adding a cam plate 250 to each hook as shown in FIG. 3. The frame 202 of the motorized wheelchair 196 will spread the hooks 82 and 104 when the wheelchair is moved forward and contact is made with the cam plates 250 any place along the length of both cam plates. The cam plates 250 also increase the allowable variation in the position of the motorized wheelchair from a position centered between the hooks 82 and 104.

The rear of the motorized wheelchair 196 is secured to the vehicle transport trailer 10 by removing velcro strips 230 on the end portions of the nylon strap 234 from velcro rings 232 on the vehicle frame 202 and inserting the left side rear hook 146 in the loop 236 on one end of the nylon strap and inserting the right side rear hook 180 in the loop on the other end of the nylon strap. The portions of the nylon strap 234, between the two loops 236 on the ends of the nylon strap, pass up over the rear wheels 198 and through the frame 202. Lifting the ramp 38 to its vertical position to close the opening 30 results in the cable tensioning arms 150 and 184 pulling the cables 148 and 182 and the attached rear hooks 146 and 180. As the cables 148 and 182 are pulled by the arms 150 and 184, the motorized wheelchair 196 is moved to the rear until it is securely held by the hooks 82 and 104 at the front and the nylon strap 234 is tight and secures the rear of the motorized wheelchair. The tension on the nylon strap 234 is adjusted by lowering the ramp 38 to the ground, loosening the wing nuts 174 on the left side rear hook and cable assembly 142 and the right side rear hook and cable assembly 144 and screwing the rear hooks 146 and 180 into the clevises 72 to increase the tension or screwing the rear hooks part way out of the clevises to reduce tension. When the tension is properly adjusted, the wing nuts 174 are tightened and the ramp 38 is raised to its vertical closed position. The rear portion 34 of the top 28 is pivoted to the closed position shown in FIGS. 1 and 2 and the rear portion of the top and the ramp 38 are latched in their closed positions. The vehicle transport trailer 10 is then ready to be pulled on the road at normal road speeds.

The motorized wheelchair 196 is unloaded from the vehicle transport trailer 10 by opening the ramp 38 and the rear portion 34 of the top 28, removing the rear hook 146 and the rear hook 180 from the loops 236 on the ends of the nylon strap 234 and attaching the velcro strips 230 to the velcro rings 232. The motorized wheelchair 196 is then moved forward a short distance and the cable 110 is pulled between the third pulley 116 and the fourth pulley 118 to disengage the hooks 82 and 104 from the frame 202. The hooks 82 and 104 are locked to the frame 202 and cannot be released until the frame is moved forward a short distance. The motorized wheelchair 196 is then ready to be removed from the vehicle transport trailer 10.

There are some motorized carts used by physically challenged individuals that do not have a forward frame structure that can be engaged by the hooks 82 and 104. In some cases, hook engaging members can be attached to the front of such a motorized cart. If the hook engaging members cannot be attached to the motorized cart, a nylon strap 240 with a loop 242 on one end and a series of loops 244 on the other end can be used. The loop 242 encircles the vertical pivot shaft 62 of the left side hook assembly 58 and the nylon strap extends around the front side of the vertical pivot shaft 88 and then along the side wall 26. The portions of the nylon strap 240 between the vertical pivot shaft 62 and the vertical pivot shaft 88 passes around a portion of the front of the cart. The nylon strap 240 can, for example, pass around the rear side of the structure for attaching a front wheel or wheels of a cart. The cart structure engaged by the nylon strap 240 is urged forward by the strap. The sleeve 72 and the sleeve 98 are positioned to hold a nylon strap 240 down. One of the loops 244 on the end of the nylon strap 240 adjacent to the side wall 26 receives the rear hook 180. The rear hook 180 is also inserted into the loop 236 on the right end of the nylon strap 234. Moving the ramp 38 to the vertical closed position will tension both nylon straps 234 and 240.

Preferred embodiments of the invention have been described in detail, but are examples only and the invention is not restricted thereto. It will be easily understood by those skilled in the art that modifications and variations can easily be made with the scope of the invention.

We claim:

1. A vehicle transport trailer, adapted to be pulled by a tow vehicle, for transporting a vehicle comprising: a generally horizontal frame; an axle assembly and at least two wheels attached to said frame; a generally horizontal platform attached to said frame; a front wall and two side walls attached to the frame and to the generally horizontal platform; a top attached to and supported by the side walls and the front wall; an opening surrounded by the two side walls, the top and the generally horizontal platform; a ramp pivotally attached to the frame adjacent to the platform for pivotal movement between a position in which the ramp is generally vertical and closes the opening and a position in which an end of said ramp rests on the ground and said ramp provides an inclined surface that extends from the ground to an edge of the generally horizontal platform; a front securing assembly for securing the front of a vehicle being transported by said vehicle transport trailer including a generally vertical left side hook pivot attached to said generally horizontal frame, a left side hook assembly mounted on the left side hook pivot and pivotable about a generally vertical axis in one direction to engage a transported vehicle and in another direction to disengage from a transported vehicle, a generally vertical right side hook pivot attached to said generally horizontal frame, a right side hook assembly mounted on the right side hook pivot and pivotable about a generally vertical axis in one direction to engage a transported vehicle and in another direction to disengage from a transported vehicle and wherein the left and right side hook assemblies are both rigid members; a rear securing assembly attached to the frame and engageable with a transported vehicle; and wherein the front securing assembly limits rearward movement relative to said trailer of a transported vehicle engaged by the right and left hook assemblies and the rear securing assembly limits forward movement relative to said trailer of a transported vehicle engaged by the rear securing assembly.

2. A vehicle transport trailer as set forth in claim 1 wherein the left side hook assembly is vertically adjustable along the left side hook pivot and wherein the right side hook assembly is vertically adjustable along the right side hook pivot to position the hook assemblies at the desired vertical position to engage the frame of a vehicle to be transported by said vehicle transport trailer and the left and right hook assemblies are retained in the desired vertical positions by hook assembly vertical retainers that limit vertical movement between the hook assemblies and the hook pivot upon which each of the hook assemblies is mounted.

3. A vehicle transport trailer as set forth in claim 2 wherein the rigid left side hook assembly includes a length adjustment and the right side hook assembly includes a length adjustment.

4. A vehicle transport trailer as set forth in claim 1 including a left side vehicle wheel guide attached to the generally horizontal platform and a right side vehicle wheel guide attached to the generally horizontal platform for laterally positioning a vehicle on the generally horizontal platform.

5. A vehicle transport trailer as set forth in claim 1 further comprising a tension spring connected to the left side hook assembly and the right side hook assembly to rotate both hook assemblies about their generally vertical axes toward engagement with a transported vehicle.

6. A vehicle transport trailer as set forth in claim 5 further comprising a cable attached to the left side hook assembly which is manually operable at a convenient location to pivot the left side hook assembly about its generally vertical axis to disengage from a transported vehicle; and a cable attached to the right side hook assembly which is manually operable at a convenient location to pivot the right side hook assembly about its generally vertical axis to disengage from a transported vehicle.

7. A vehicle transport trailer as set forth in claim 1 wherein the rear securing assembly comprises a first rear hook and cable assembly with a first rear hook adapted to be connected to a transported vehicle, a cable connected to the first rear hook and to a cable tensioning arm secured to said ramp and wherein the cable tensioning arm is operable to tighten the cable of the first rear hook and cable assembly as said ramp is moved toward a position in which the opening is closed.

8. A vehicle transport trailer as set forth in claim 7 wherein the rear securing assembly further comprises a second rear hook and cable assembly with a second rear hook adapted to be connected to a transported vehicle, a cable connected to the second rear hook and to a second cable tensioning arm secured to said ramp and wherein the second cable tensioning arm is operable to tighten the cable of the second rear hook and cable assembly as said ramp is moved toward a position in which the opening is closed.

9. A vehicle transport trailer as set forth in claim 8 wherein the rear securing assembly includes at least two guide pulleys which the cable of the first rear hook and cable assembly is trained around; and at least two guide pulleys which the cable of the second rear hook and cable assembly is trained around.

10. A vehicle transport trailer as set forth in claim 9 including a cable slack take-up spring attached to the first rear hook and cable assembly and to said frame; and a cable slack take-up spring attached to the second rear hook and cable assembly and to said frame.

11. A vehicle transport trailer, adapted to be pulled by a tow vehicle, for transporting a vehicle comprising: a generally horizontal frame; an axle assembly and at least two wheels attached to said frame; a generally horizontal platform attached to said frame; a ramp pivotally attached to the frame adjacent to the platform for pivotal movement between a transport position and a position in which an end of said ramp rests on the ground and said ramp provides an inclined surface that extends from the ground to an edge of said generally horizontal platform; a front securing assembly adapted to secure the front of a vehicle being transported by said vehicle transport trailer and limiting rearward movement of a transported vehicle; a rear securing assembly, for securing the rear of a vehicle being transported by said vehicle transport trailer and limiting forward movement of a transported vehicle, including a first rear hook and cable assembly with a first rear hook adapted to be connected to a transported vehicle, a cable with one end connected to said first rear hook, and a cable tensioning arm secured to said ramp and to the cable of the first rear hook and cable assembly and wherein the cable tensioning arm is operable to tighten the cable of the first rear hook and cable assembly as said ramp is moved to said transport position.

12. A vehicle transport trailer as set forth in claim 11 wherein the rear securing assembly further comprises a second rear hook and cable assembly with a second rear hook adapted to be connected to a transported vehicle, a cable with one end connected to said second rear hook, another cable tensioning arm secured to said ramp and to the cable of the second rear hook and cable assembly and wherein said another cable tensioning arm is operable to tighten the cable of the second rear hook and cable assembly as said ramp is moved to said transport position.

13. A vehicle transport trailer as set forth in claim 12 wherein the rear securing assembly includes at least one guide pulley which the cable of the first rear hook and cable assembly is trained around; and at least one guide pulley which the cable of the second rear hook and cable assembly is trained around.

14. A vehicle transport trailer as set forth in claim 12 wherein the rear securing assembly includes at least two guide pulleys which the cable of the first rear hook and cable assembly is trained around; and at least two guide pulleys which the cable of the second rear hook and cable assembly is trained around.

15. A vehicle transport trailer as set forth in claim 11 wherein the front securing assembly includes a flexible retainer adapted to be connected to a transported vehicle and to said first rear hook and cable assembly and a flexible retainer guide that guides and holds the flexible retainer so that the flexible retainer limits rearward movement of a transported vehicle.

16. A vehicle transport trailer, for transporting a vehicle comprising: a generally horizontal frame; an axle assembly and at least two wheels attached to said frame; a generally horizontal platform attached to said frame; a ramp pivotally attached to the frame adjacent to the platform for pivotal movement between a position in which the ramp is generally vertical and a position in which an end of said ramp rests on the ground and said ramp provides an inclined surface that extends from the ground to an edge of the generally horizontal platform; a front securing assembly for securing the front of a vehicle being transported by said trailer including a left side hook pivot attached to said generally horizontal frame, a rigid left side hook assembly mounted on the left side hook pivot and pivotable about the left side hook pivot in one direction to engage a transported vehicle and in another direction to disengage from a transported vehicle, a right side hook pivot attached to said generally horizontal frame, a rigid right side hook assembly mounted on the right side hook pivot and pivotable about the right side hook pivot in one direction to engage a transported vehicle and in another direction to disengage from a transported vehicle; a rear securing assembly attached to the frame and engageable with a transported vehicle; and wherein the front securing assembly limits rearward movement relative to said trailer of a transported vehicle engaged by the right and left hook assemblies and the rear securing assembly limits forward movement relative to said trailer of a transported vehicle engaged by the rear securing assembly.

* * * * *